US010393534B2

(12) United States Patent
Giurgiu et al.

(10) Patent No.: US 10,393,534 B2
(45) Date of Patent: Aug. 27, 2019

(54) DETERMINING SPEED INFORMATION

(71) Applicant: HERE Global B.V., Eindhoven (NL)

(72) Inventors: Gavril Giurgiu, Deerfield, IL (US);
Anton Anastassov, Naperville, IL (US);
Dongwook Jang, Lisle, IL (US)

(73) Assignee: HERE Global B.V., Eindhoven (NL)

( * ) Notice: Subject to any disclaimer, the term of this patent is extended or adjusted under 35 U.S.C. 154(b) by 140 days.

(21) Appl. No.: 15/164,058

(22) Filed: May 25, 2016

(65) Prior Publication Data

US 2017/0343370 A1   Nov. 30, 2017

(51) Int. Cl.
G08G 1/01   (2006.01)
G08G 1/052  (2006.01)
(Continued)

(52) U.S. Cl.
CPC ........ *G01C 21/3492* (2013.01); *G01C 21/20*
(2013.01); *G01C 21/3691* (2013.01);
(Continued)

(58) Field of Classification Search
CPC ..... G08G 1/0112; G08G 1/0133; G08G 1/052
See application file for complete search history.

(56) References Cited

U.S. PATENT DOCUMENTS 6,385,539 B1   5/2002   Wilson et al.
6,804,580 B1  10/2004   Stoddard et al.
(Continued)

FOREIGN PATENT DOCUMENTS

CN   102540978 A   7/2012
EP   2 180 456 A1  4/2010
(Continued)

OTHER PUBLICATIONS

Office Action for U.S. Appl. No. 15/163,963 dated Aug. 30, 2017.
(Continued)

*Primary Examiner* — Charles J Han
(74) *Attorney, Agent, or Firm* — Alston & Bird LLP

(57) ABSTRACT

A method is presented, which comprises:
 obtaining or holding available map data representing, at least in part, a travel network,
 determining, for at least one selected link of the travel network represented by the map data, a plurality of potential travel paths, wherein each potential travel path of the plurality of potential travel paths for the at least one selected link is at least partially defined by an incoming link of the travel network and an outgoing link of the travel network that are linked by the selected link and a direction of travel from the incoming link to the outgoing link on the selected link,
 for each potential travel path of the plurality of potential travel paths, determining whether the respective potential travel path is at least partially defined by a short incoming link and, if it is determined that the respective potential travel path of the potential travel paths is at least partially defined by a short incoming link, replacing the respective potential travel path of the plurality of potential travel paths with one or more further potential travel paths, wherein each of the further potential travel paths is at least partially defined by a further incoming link of the travel network linked by the short incoming link with the selected link and the outgoing link and a direction of travel from the further incoming link to the outgoing link on the selected link,
 for each potential travel path of the plurality of potential travel paths, determining a respective speed profile at least partially based on a plurality of respective probe data points of one or more respective probe data sets of a plurality of probe data sets, the one or more respective probe data sets associated with the respective potential travel path for which the respective speed profile is determined.

(Continued)

Further presented are inter-alia corresponding apparatuses, a corresponding system and a corresponding computer program code.

33 Claims, 6 Drawing Sheets

(51) Int. Cl.

| | |
|---|---|
| *G08G 1/0968* | (2006.01) |
| *G01C 21/20* | (2006.01) |
| *G01C 21/34* | (2006.01) |
| *G01C 21/36* | (2006.01) |
| *G05D 1/00* | (2006.01) |
| *G08G 1/00* | (2006.01) |

(52) U.S. Cl.
CPC ........... *G05D 1/0088* (2013.01); *G08G 1/012* (2013.01); *G08G 1/0112* (2013.01); *G08G 1/0129* (2013.01); *G08G 1/0133* (2013.01); *G08G 1/0145* (2013.01); *G08G 1/052* (2013.01); *G08G 1/096811* (2013.01); *G08G 1/096827* (2013.01); *G08G 1/096844* (2013.01); *G08G 1/22* (2013.01)

(56) References Cited

U.S. PATENT DOCUMENTS

| | | |
|---|---|---|
| 6,850,841 B1 | 2/2005 | Casino |
| 7,418,346 B2 | 8/2008 | Breed |
| 8,005,602 B2 | 8/2011 | Bando et al. |
| 8,352,111 B2 | 1/2013 | Mudalige |
| 8,352,112 B2 | 1/2013 | Mudalige |
| 8,406,939 B2 | 3/2013 | Jackson et al. |
| 8,494,759 B2 | 7/2013 | Hada |
| 8,615,361 B2 | 12/2013 | Papajewski et al. |
| 8,676,466 B2 | 3/2014 | Mudalige |
| 8,937,778 B1 | 3/2015 | McCarthy |
| 9,053,632 B2 | 6/2015 | Shen et al. |
| 9,240,123 B2 | 1/2016 | Stenneth |
| 9,746,331 B1* | 8/2017 | Yu .......................... G01C 21/206 |
| 9,755,850 B2 | 9/2017 | Stolfus |
| 9,785,145 B2 | 10/2017 | Gordon et al. |
| 9,880,019 B2 | 1/2018 | McCarthy |
| 9,958,283 B2 | 5/2018 | Anastassov et al. |
| 2004/0172189 A1 | 9/2004 | Maeda |
| 2006/0095195 A1 | 5/2006 | Nishimura et al. |
| 2006/0262662 A1* | 11/2006 | Jung ...................... G08G 1/092 369/1 |
| 2007/0192013 A1 | 8/2007 | Bando et al. |
| 2008/0046165 A1 | 2/2008 | Downs et al. |
| 2008/0294331 A1* | 11/2008 | Fushiki ................ G08G 1/0104 701/119 |
| 2010/0256835 A1* | 10/2010 | Mudalige ............... G08G 1/163 701/2 |
| 2011/0121993 A1 | 5/2011 | Davis et al. |
| 2011/0153166 A1 | 6/2011 | Yester |
| 2011/0307165 A1 | 12/2011 | Hiestermann et al. |
| 2012/0059535 A1 | 3/2012 | Jackson et al. |
| 2012/0059574 A1 | 3/2012 | Hada |
| 2012/0095682 A1 | 4/2012 | Wilson |
| 2012/0209505 A1 | 8/2012 | Breed et al. |
| 2012/0283942 A1 | 11/2012 | T'Siobbel et al. |
| 2013/0021382 A1 | 1/2013 | Morlock et al. |
| 2013/0275033 A1 | 10/2013 | Bastiaensen et al. |
| 2013/0282264 A1 | 10/2013 | Bastiaensen et al. |
| 2013/0297196 A1 | 11/2013 | Shida |
| 2013/0311076 A1 | 11/2013 | Mieth et al. |
| 2014/0149028 A1 | 5/2014 | Chapman et al. |
| 2014/0278052 A1 | 9/2014 | Slavin et al. |
| 2014/0288811 A1 | 9/2014 | Oura |
| 2014/0289267 A1 | 9/2014 | Felix et al. |
| 2014/0297182 A1 | 10/2014 | Casson et al. |
| 2015/0006069 A1 | 1/2015 | Kwon et al. |
| 2015/0100216 A1 | 4/2015 | Rayes |
| 2015/0120174 A1 | 4/2015 | Lewis |
| 2015/0300825 A1 | 10/2015 | Manoliu et al. |
| 2015/0345971 A1 | 12/2015 | Meuleau et al. |
| 2016/0223348 A1 | 8/2016 | Witte et al. |
| 2017/0032667 A1 | 2/2017 | Fowe et al. |
| 2017/0341660 A1 | 11/2017 | Jang et al. |

FOREIGN PATENT DOCUMENTS

| | | |
|---|---|---|
| WO | WO 2014/091982 A1 | 6/2014 |
| WO | WO-2015/145637 A1 | 10/2015 |

OTHER PUBLICATIONS

Ou et. al, A Theoretical Framework for Traffic Speed Estimation by Fusing Low-resolution Probe Vehicle Data, IEEE Transactions on Intelligent Transportation Systems, vol. 12, No. 3, Sep. 2011, pp. 747-756.

Tong et al., "Traffic Information Deriving Using GPS Probe Vehicle Data Integrated With G)S", Center for Urban and Regional Analysis and Department of Geography, Nov. 17, 2005, 24 pages.

Aguilera et al., "A New Kind of Fundamental Diagram with an Application to Road Traffic Emission Modelling", Journal of advanced transporation, vol. 48, 2014, pp. 1-23.

"Acceleration smoothing", Smoothing results—R&D Traffic Technologies Group (TTG)—HERE Confluence Wiki, Retrieved on Sep. 28, 2016, Webpage available at : https://confluence.in.here.com/display/PDOD/Smoothing+results.

"Smoothing Spline", Wikipedia, Retrieved on Sep. 28, 2016, Webpage available at : https://en.wikipedia.org/wiki/Smoothing_spline.

Duran et al., "GPS Data Filtration Method for Drive Cycle Analysis Applications", SSR Technical Paper, Apr. 16, 2012, 6 Pages.

Villagra et al., "Smooth Path and Speed Planning for an Automated Public Transport Vehicle", Robotics and Autonomous Systems, vol. 60, No. 2, Feb. 2012, pp. 252-265.

Jun et al, "Smoothing Methods to Minimize Impact of Global Positioning System Random Error on Travel Distance, Speed, and Acceleration Profile Estimates", Journal of the Transportation Research Board, 1972, p. 141-150.

Labakhua et al., "Smooth Trajectory Planning for Fully Automated Passengers Vehicles", In informatics in control, automation and robotics III, 2007, 8 pages.

"Local Polynomial Regression Fitting", Stat.ethz.ch/R-manual, Retrieved on Sep. 27, 2016, Webpage available at : https://stat.ethz.ch/R-manual/R-devel/library/stats/html/loess.html.

"Scatter Plot Smoothing", Stat.ethz.ch/R-manual, Retrieved on Oct. 19, 2016, Webpage available at : https://stat.ethz.ch/R-manual/R-devel/library/stats/html/lowess.html.

"Fit a Smoothing Spline", Stat.ethz.ch/R-manual, Retrieved on Oct. 19, 2016, Webpage available at : https://stat.ethz.ch/R-manual/R-devel/library/stats/html/smooth.spline.html.

"Friedman's SuperSmother", Stat.ethz.ch/R-manual, Retrieved on Sep. 27, 2016, Webpage available at : https://stat.ethz.ch/R-manual/R-patched/library/stats/html/supsmu.html.

"Rolling Means/Maximums/Medians /Sums", R project, Retrieved on Sep. 27, 2016, Webpage available at : http://search.r-project.org/library/zoo/html/rollmean.html.

"The R Project for Statistical Computing", R project, Retrieved on Sep. 27, 2016, Webpage available at : https://www.r-project.org.

International Search Report and Written Opinion from International Patent Application No. PCT/EP2017/062633, dated Sep. 13, 2017, 15 pages.

Extended European Search Report for European Patent Application No. 17172827.2 dated Oct. 4, 2017, 4 pages.

Office Action for U.S. Appl. No. 15/164,172 dated Dec. 29, 2017, 20 pages.

Office Action for U.S. Appl. No. 15/164,096 dated Jan. 10, 2018, 20 pages.

Office Action for U.S. Appl. No. 15/366,254 dated Jan. 17, 2018, 24 pages.

(56) References Cited

OTHER PUBLICATIONS

International Preliminary Report on Patentability (Chapter II) for Application No. PCT/EP2017/062633 dated Aug. 20, 2018.
Advisory Action and Interview Summary for U.S. Appl. No. 15/164,096 dated Aug. 28, 2018.
Office Action for U.S. Appl. No. 15/366,254 dated Jul. 6, 2018, 5 pages.
Notice of Allowance for U.S. Appl. No. 15/164,172 dated Jul. 11, 2018.
Office Action for U.S. Appl. No. 15/164,096 dated May 17, 2018.
Notice of Allowance for U.S. Appl. No. 15/163,963 dated Feb. 26, 2018.
Notice of Allowance for U.S. Appl. No. 15/163,963 dated Mar. 27, 2018.
Office Action for U.S. Appl. No. 15/366,254 dated Oct. 12, 2018.

\* cited by examiner

DETERMINING SPEED INFORMATION

FIELD

The invention relates to the field of determining speed information and more specifically to determining speed information (e.g. one or more potential travel path-specific speed profiles) for a vehicle (e.g. for autonomous vehicles, highly-assisted-driving vehicles and/or vehicles with predictive cruise control).

BACKGROUND

There have been multiple recent developments in the transportation technology that are revolutionizing the way people experience driving. Such technologies include connected vehicles with mobile access to the internet, adaptive cruise control or autonomous navigation and platooning. Adaptive cruise control systems automatically change the vehicle speed to accommodate curves, traffic congestions or road incidents. Autonomous vehicles take a step farther by taking control not only of the vehicle speed but also of the wheel steering, when turning or changing lanes, with the ultimate goal of taking full control of the whole driving process and thus enabling drivers to become passengers, with all the benefits associated with being relieved from the task of driving. Finally, platooning of multiple trucks would save energy, reduce $CO_2$ emissions and reduce the strain of human drivers. Platooning could open new avenues not only in the trucking industry but also for consumers by releasing the drivers from the task of maneuvering the vehicles. In such platoons the lead vehicle drives either manually or autonomously, followed by vehicles without autonomous driving capacity, in which the drivers become passengers.

SUMMARY OF SOME EMBODIMENTS OF THE INVENTION

In all of the three cases described above, adaptive cruise control, autonomous navigation and platooning, it is conceivable that the vehicles would benefit from using the collective knowledge accumulated from other traffic participants such as human and/or robotic driving experiences. An important quantity that defines the motion of a vehicle is the speed. Traffic participants travel at different speeds on a given link such as a road section. The distribution of these speeds on the link may be characterized by one or more statistical distribution descriptors, including, but not limited to, mean speed, median speed, other speed percentiles, and various measures of the distribution width and shape. The evolution of one or more of these descriptors along a link may be understood to be represented by a speed profile. For example, a median speed profile may represent one or more speeds along the link such that half of the vehicles travel slower, and the other half travel at higher speeds. The speed profiles may be created with high spatial granularity along the link.

Such speed profiles can be used by predictive cruise control and autonomous vehicles to provide a human-like driving experience. However, a problem can appear on a link before and/or after a junction or a split in a travel route. The speed distribution or profile on these links may have a bi-modal or multi-modal structure and, therefore, a mean speed profile for such links would for example represent neither the high continuing speed nor the low turning or exiting speed of the one or more possible options.

According to an exemplary aspect of the invention, a method is presented which comprises:

obtaining or holding available map data representing, at least in part, a travel network, determining, for at least one selected link of the travel network represented by the map data, a plurality of potential travel paths, wherein each potential travel path of the plurality of potential travel paths for the at least one selected link is at least partially defined by an incoming link of the travel network and an outgoing link of the travel network that are linked by the selected link and a direction of travel from the incoming link to the outgoing link on the selected link, for each potential travel path of the plurality of potential travel paths, determining whether the respective potential travel path is at least partially defined by a short incoming link and, if it is determined that the respective potential travel path of the potential travel paths is at least partially defined by a short incoming link, replacing the respective potential travel path of the plurality of potential travel paths with one or more further potential travel paths, wherein each of the further potential travel paths is at least partially defined by a further incoming link of the travel network linked by the short incoming link with the selected link and the outgoing link and a direction of travel from the further incoming link to the outgoing link on the selected link, for each potential travel path of the plurality of potential travel paths, determining a respective speed profile at least partially based on a plurality of respective probe data points of one or more respective probe data sets of a plurality of probe data sets, the one or more respective probe data sets associated with the respective potential travel path for which the respective speed profile is determined.

The presented method may be performed by an apparatus or by a plurality of apparatuses. For example, the presented method may be performed by any one embodiment of the below presented apparatuses. Alternatively or additionally, the presented method may be performed by a plurality of any one embodiment of the below presented apparatuses.

Holding available the map data may be understood to mean that the map data are stored in memory means of the apparatus performing the method. Example of memory means include a volatile memory and a non-volatile memory. Alternatively or additionally, the map data could be obtained by determining the map data or by receiving the map data, for example by a communication interface of the apparatus performing the presented method.

The map data may represent the travel network at least in part by representing a map of at least a part of the travel network.

A link may be a section of the travel network, for example a section between two junctions of the travel network. The at least one selected link could be such a link of the travel network, for example an arbitrary link of the travel network which is selected for performing the method. A link may be directional link (i.e. only relating to one travel direction on the link) or a non-directional link (relating to more than one travel direction on the link). Each link may be associated with a link identifier (e.g. a unique link identifier).

As a result of the determining, for the at least one selected link, the plurality of potential travel paths an indication (e.g. a definition) for each potential travel path of the plurality of potential travel paths may be obtained. For example, a list defining the plurality of potential travel paths for the selected link may be obtained.

Determining the plurality of potential travel paths may be performed at least partially based on the map data.

By replacing a respective potential travel path of the plurality of potential travel paths with the one or more further potential travel paths, if it is determined that the respective potential travel path of the potential travel paths is at least partially defined by a short incoming link, undesired effects associated with such short incoming links when determining a speed profile for a potential travel path may be compensated.

For example, the speed distributions of vehicles entering a short incoming link straight and vehicles entering the short incoming link by a 90-degree turn may be different at the end of the incoming link which may result in a bimodal speed distribution of vehicles entering the selected link through the short incoming link.

The potential travel path at least partially defined by the short incoming link may thus not properly reflect this situation. This may be overcome by replacing this potential travel path with two further potential travel paths one of which is at least partially defined by the further (indirect) incoming link allowing to enter the short incoming link straight and the other one of which is at least partially defined by the further (indirect) incoming link requiring the 90-degree turn to enter the short incoming link.

The one or more further potential travel paths may be labeled in order to be identified as replacements of a potential travel path determined to be at least partially defined by a short incoming link.

It is to be understood that the one or more further potential travel paths may be part of the plurality of potential travel paths and may be treated as potential travel paths. The potential travel paths determined to be at least partially defined by a short incoming link may be deleted from the plurality of potential travel paths.

As a result of the replacing, an indication (e.g. a definition) for the one or more further potential travel paths may be obtained. For example, each indication may define one of the one or more further potential travel paths.

For example, an adapted list defining the plurality of potential travel paths with the one or more further potential travel paths for the selected link may be obtained.

A potential travel path of the selected link may be uniquely defined by specifying the selected link, an (direct and/or indirect) incoming link and an outgoing link and, optionally, a direction of travel on the selected link, the incoming link and the outgoing link. For example, each link may be specified by a link identifier. The direction of travel may correspond to the direction from the incoming link through the selected link to the outgoing link and, thus, may for example be derivable from the specification of the incoming link and the outgoing link. It may thus not be necessary to specify the direction of travel for defining a potential travel path of the selected link.

An incoming link may be understood to be a (direct incoming) link adjacent to the selected link through which the selected link may be (directly) entered or, in case of a short incoming link, a (indirect incoming) link linked by the short incoming link to the selected link through which the selected link may be (indirectly) entered, and an outgoing link may be understood to be a (direct outgoing) link adjacent to the selected link through which the selected link may be exited.

Generally, for a selected link having N incoming links and M outgoing links, there exist at least N×M potential travel paths.

Accordingly, each potential travel of the plurality of potential travel paths may represent a specific option for (directly or indirectly) entering the at least one selected link and for exiting the at least one selected link and, thus, each potential travel path of the plurality of potential travel paths may have different features (e.g. a different course).

The plurality of potential travel paths may be understood to comprise at least two potential travel paths, more specifically at least three potential travel paths.

The plurality of probe data sets may comprise at least two probe data sets, more specifically at least three probe data sets. For example, the plurality of probe data sets may comprise more than 1000 probe data sets.

The plurality of respective probe data points and the one or more respective probe data sets may be different for each potential travel paths of the plurality of potential travel path.

The plurality of respective probe data points may comprise at least two probe data points, more specifically at least three probe data points. For example, the plurality of respective probe data points may comprise more than 100 probe data points.

A probe data set may be understood to be associated with a potential travel path if it is associated with a travel route including the potential travel path. For example, in determining, for each potential travel path of the plurality of potential travel paths, a respective speed profile only probe data sets may be used that are associated with the respective potential travel path. This may have the effect that different speed profiles may be obtained for different potential travel paths which may enable to determine speed profiles adapted to the different features (e.g. different courses) of the different travel paths (e.g. a speed profile for a curvy potential travel path may be different than a speed profile for a straight potential travel path).

A speed profile for a potential travel path of the selected link may be understood to represent speed information, for example speed information for a vehicle. A speed profile for a potential travel path of the selected link may for example represent speed information for a vehicle travelling on the selected link along the potential travel path. Accordingly, the speed profile for a potential travel path of the selected link may be a potential travel path-specific speed profile for the selected link.

The presented method may be for determining speed information, for example for determining speed information for a vehicle.

According to a further exemplary aspect of the invention, an apparatus is presented, which comprises means for performing, at least in part, the steps of any one embodiment of the presented method.

The means of the presented apparatus can be implemented in hardware and/or software. They may comprise for instance a processor for executing computer program code for realizing the required functions, a memory storing the program code, or both. Alternatively, they could comprise for instance circuitry that is designed to realize the required functions, for instance implemented in a chipset or a chip, like an integrated circuit. The presented apparatus may comprise a single means for all functions, a common plurality of means for all functions, or a plurality of different means for different functions.

According to a further exemplary aspect of the invention, another apparatus is presented, which comprises at least one processor and at least one memory including computer program code, the at least one memory and the computer program code with the at least one processor configured to cause the apparatus at least to perform, at least in part, the steps of any one embodiment of the presented method.

The presented apparatuses may be modules or components for a device, for example chips. Alternatively, the presented apparatuses may be devices. The presented apparatuses may comprise only the disclosed components (e.g. means) or may further comprise one or more additional components.

The presented apparatuses may be for determining speed information, for example for determining speed information for a vehicle.

The presented apparatuses may be or may be part of one of a server, a stationary device, a module for a device, a vehicle or an embedded navigation device of a vehicle.

According to a further exemplary aspect of the invention, a system is presented which comprises a plurality of apparatuses which are configured to perform, together, the steps of any one embodiment of the presented method. The apparatuses of the presented system may at least partially correspond to any one of the presented apparatuses according to an exemplary aspect of the invention. For example, the presented system may comprise a server or a server cloud for determining speed information for a vehicle and a vehicle.

According to a further exemplary aspect of the invention, a non-transitory computer readable storage medium is presented, in which computer program code is stored. The computer program code causes at least one apparatus to perform the steps of any one embodiment of the presented method when executed by a processor. The computer program code could be stored in the computer readable storage medium in the form of instructions encoding the computer-readable storage medium. The computer readable storage medium may be intended for taking part in the operation of a device, like an internal or external hard disk of a computer, or be intended for distribution of the program code, like an optical disc.

According to a further exemplary aspect of the invention, a computer program code is presented, the computer program code when executed by a processor causing an apparatus to perform the steps of any one embodiment of the presented method.

In the following, further features and embodiments of these exemplary aspects of the invention will be described.

According to an exemplary embodiment of the invention, the determining whether the respective potential travel path of the potential travel paths is at least partially defined by a short incoming link is at least partially based on at least one of:
  a length of the incoming link,
  a speed limit on the incoming link,
  a mean speed for the incoming link,
  a median speed for the incoming link.

For example, an incoming link having a length below a predetermined length threshold may be determined to be a short incoming link. Examples of such a predetermined length threshold may be 200 m, 400 m or 600 m. For different link types (e.g. motorways, main roads and side roads) or in different areas different predetermined length thresholds may be used.

Alternatively or additionally, an incoming link may be determined to be a short incoming link if the length of the link is determined to be not sufficient for accelerating or decelerating to a speed limit on the incoming link or a mean speed for the incoming link or a median speed for the incoming link for a predetermined acceleration. An example of such a predetermined acceleration is 0.3 g and of such a predetermined deceleration is −0.3 g (with g describing the standard value of the gravitational acceleration, i.e. 9.80665 m/s2).

According to an exemplary embodiment of the invention, the travel network is a road network. Accordingly, a link of the travel network represented by the map data may be understood to be a road section of the road network, for example a road section between two junctions of the road network.

According to an exemplary embodiment of the invention, the plurality of potential travel paths comprises a potential travel path for each allowed and/or possible combination of an (direct and/or indirect) incoming link and an outgoing link represented by the map data and linked by the selected link or, in case of a short incoming link, linked by the selected link and the short incoming link. This may have the effect that each option for entering the at least one selected link and for exiting the at least one selected link is represented by the plurality of potential travel paths.

According to an exemplary embodiment of the invention, the presented method further comprises obtaining or holding available the plurality of probe data sets.

Holding available the plurality of probe data sets may be understood to mean that the plurality of probe data sets is stored in memory means of an apparatus performing the method. Alternatively or additionally, the plurality of probe data sets could be obtained by receiving the plurality of probe data sets, for example by communication means of an apparatus performing the presented method.

According to an exemplary embodiment of the invention, each probe data point of the plurality of probe data points represents a position and a speed, for example a position of a mobile device and a speed of this mobile device at this position. Examples of such a mobile device may be a vehicle, a navigation device and/or a smartphone.

The position may be a position associated with a position captured by the mobile device. For example, the position may be a Global Navigation Satellite System (GNSS) position captured by a GNSS sensor of the mobile device. Alternatively or additionally, the position may be a map matched GNSS position representing a GNSS position captured by a GNSS sensor of the mobile device that has been matched to the travel network represented by the map data.

The speed may be associated with a speed captured by the mobile device. Alternatively or additionally, the speed may be determined at least partially based on one or more positions captured by the mobile device, for example by calculating the speed based on the distance between two positions captured by the mobile device and the time difference between capturing these two positions.

According to an exemplary embodiment of the invention, each probe data set of the plurality of probe data points may comprise a sequence of probe data points representing a position and a speed of a specific mobile device.

This may have the effect that a probe data set of the plurality of probe data sets and the probe data points of this probe data set of the plurality of probe data sets may be associated with a travel route of a specific mobile device. Each of these probe data sets may thus be considered to represent historic experiences of human drivers travelling along this travel route. A considerable amount of such probe data sets has been collected by service providers over time and this plurality of (historic) probe data sets can be used for determining travel path-specific speed profiles for the plurality of potential travel paths. To avoid a falsification of the potential travel path-specific speed profiles due to traffic congestions, only probe data sets collected during weekends and during night, from 8 pm to 7 am, during business days may be used for determining travel path-specific speed profiles for the plurality of potential travel paths.

A probe data set may be understood to be associated with a potential travel path if the probe data set is associated with a travel route of a specific mobile device including the potential travel path. This may have the effect that a speed profile for a potential travel path is determined based on one or more probe data points representing one or more speeds and positions of specific mobile devices which were travelling along a travel route including this potential travel path. Accordingly, different speed profiles may be obtained for different potential travel paths of the selected link which may be based on historic speeds of different mobile devices travelling along different travel routes including one of these different potential travel paths and, thus, enable speed profiles adapted to the different features (e.g. different courses) of the different travel paths. For example, mobile devices entering and exiting the selected link straight typically have higher speeds than mobile devices entering and/or exiting by a 90-degree turn. Accordingly, speed profiles which may be perceived as human-like speed profiles (i.e. speed profiles of vehicles with human drivers traveling on the selected link) may be obtained. The speed(s) represented by a speed profile for a potential travel path of the plurality of potential travel paths may be speed(s) at which an individual may still feel safe and comfortable within a vehicle while traveling on the selected link along the potential travel path and/or at which a vehicle may safely interact with one or more other vehicles while traveling on the selected link along the potential travel.

Each probe data point of a specific probe data set may comprise the identifier of the probe data set. The identifier may be indicative for a session of a service provider collecting probe data sets of a mobile device, a mobile device, or a combination thereof.

According to an exemplary embodiment of the invention, the respective speed profile (e.g. each speed profile for the selected link) represents one speed for the selected link or a plurality of speeds for a plurality of subsequent segments of the selected link.

Each of the plurality of speeds may be a speed for a respective segment of the plurality of subsequent segments of the selected link.

For example, the selected link may be divided into the plurality of subsequent segments. This may enable a high spatial granularity of the speed profile. Each of the segments may have the same length (e.g. 10 m). Alternatively the segments may have at least partially different length.

According to an exemplary embodiment of the invention, the respective speed profile (e.g. each speed profile for the selected link) is at least partially determined by calculating one or more mean speeds, one or more speed percentiles or one or more combinations thereof for the selected link or for one or more subsequent segments of the selected link.

For example, this calculating is at least partially based on one or more speeds represented by one or more probe data points of the plurality of respective probe data points of the one or more respective probe data sets associated with the respective potential travel path. These one or more probe data points may represent positions on the selected link, for example on the one or more subsequent segments of the selected link.

Examples of calculated speed percentiles are a 10% speed percentile, a 25% speed percentile, a 30% speed percentile, a 50% speed percentile (i.e. the median speed), a 70% speed percentile, a 75% speed percentile, a 90% speed percentile or combinations thereof.

For example, for determining a speed profile representing a plurality of speeds for a plurality of subsequent segments of the selected link, for each segment of the subsequent segments, a mean speed or a speed percentile may be calculated based on probe data points representing a position on the respective segment.

For example, for determining a speed profile representing one speed for the selected link, a mean speed or a speed percentile may be calculated based on probe data points representing a position on the selected link.

For example, different speed profiles for a potential travel path could be determined for vehicles transporting human passengers (which have to account for the passenger comfort) and for vehicles transporting only goods or traveling empty to pick up passengers. In the latter case, without the constraints related to the human comfort, it is conceivable that autonomous vehicles would drive much faster than the ones driven by humans, while still maintaining the highest safety standards. For speed profiles for vehicles transporting human passengers for example the 50% speed percentile (i.e. the median speed) or the 70% speed percentile may be used; and for speed profiles for vehicles transporting only goods or traveling empty to pick up passengers for example the 75% speed percentile or the 90% speed percentile may be used.

According to an exemplary embodiment of the invention, the presented method further comprises determining whether one or more probe data sets of the plurality of probe data sets are associated with a potential travel path of the plurality of potential travel paths at least partially based on one or more positions represented by one or more probe data points of the one or more probe data sets. As a result, for each potential travel path of the plurality of potential travel paths, information on one or more probe data sets of the plurality of probe data sets associated with the respective potential travel path may be obtained.

As described above, a probe data set may be understood to be associated with a potential travel path if the probe data set is associated with a travel route of a specific mobile device including the potential travel path.

For example, for determining a speed profile for a potential travel path of the plurality of travel paths, only probe data points of one or more probe data sets of the plurality of probe data sets are used that are determined to be associated with this potential travel path of the plurality of travel paths. Accordingly, each of the determined speed profiles may be a potential travel path-specific speed profile for the selected link.

Each probe data set of the plurality of probe data sets may be determined to be associated with only one potential travel path of the plurality of potential travel paths.

The one or more probe data sets of the plurality of probe data sets may be determined to be associated with a potential travel path of the plurality of potential travel paths at least partially based on the number of probe data points of the one or more probe data sets that represent a position associated with an incoming link (e.g. a direct or indirect incoming link) or an outgoing link at least partially defining the potential travel paths.

For example, a voting algorithm for identifying the most probable incoming link or outgoing link may be used. The voting algorithm may be at least partially based on the number of probe data points of a probe data set that represent a position associated with an incoming link or an outgoing link at least partially defining one potential travel path of the plurality of potential travel path. A probe data set may be determined to be associated with a potential travel path of the plurality of potential travel paths that is at least partially defined by an incoming link associated with the largest number of positions represented by probe data points of this probe data set and an outgoing link associated with the largest number of positions represented probe data points of this probe data set. Otherwise, the probe data set may be determined to be not associated with a potential travel path of the plurality of potential travel paths. This may have the effect that the impact of erroneous positions (e.g. positions that have been erroneously matched to the travel network represented by the map data) is minimized.

For example, the determining whether one or more probe data sets of the plurality of probe data sets are associated with a potential travel path of the plurality of potential travel paths may comprise checking, for the probe data points of the one or more probe data sets of the plurality of probe data sets, whether they are associated with an incoming link or and outgoing link.

A condition for identifying a position represented by a probe data point of the one or more probe data sets of the plurality of probe data sets to be associated with an incoming link (e.g. a direct and/or indirect incoming link) may be at least one of the following:
the position is on the incoming link,
the position is on a link different from the selected link and directly linked to the incoming link.

A condition for identifying a position represented by a probe data point of the one or more probe data sets of the plurality of probe data sets to be associated with an outgoing link may be at least one of the following:
the position is on the outgoing link,
the position is on a link different from the selected link and directly linked to the outgoing link.

If the incoming link (e.g. the direct and/or indirect incoming link) or the outgoing link or the link different from the selected link and directly linked to the outgoing link or the incoming link is a directional link, an additional condition for identifying a position represented by a probe data point of the one or more probe data sets of the plurality of probe data sets to be associated with an incoming link or an outgoing link may be:
the direction of the incoming link or the outgoing link or the link different from the selected link and directly linked to the outgoing link or the incoming link is equal to the travel direction derivable from the sequence of probe data points of the respective probe data set.

Considering positions on a link different from the selected link and directly linked to the incoming link or the outgoing link, may be advantageous in cases of a rather short incoming link or a rather short outgoing link to increase the number of positions associated with the incoming link or the outgoing link.

The one or more probe data sets of the plurality of probe data sets may be determined to be associated with a potential travel path of the plurality of potential travel paths at least partially based on a travel direction (e.g. a travel direction on the selected link and/or on the incoming link and/or on the outgoing link and/or on the link different from the selected link and directly linked to the outgoing link or the incoming link) derivable from the sequence of probe data points of the one or more probe data sets. Accordingly, the determining whether one or more probe data sets of the plurality of probe data sets are associated with a potential travel path of the plurality of potential travel paths may comprise deriving, for the one or more probe data sets of the plurality of probe data sets, a direction of travel (e.g. a direction of travel on the selected link).

According to an exemplary embodiment of the invention, the presented method further comprises providing or generating speed map data representing an association of the map data and a plurality of speed profiles for links of the travel network, the plurality of speed profiles comprising the speed profiles determined for the plurality of potential travel paths (e.g. the respective speed profiles for each potential travel path of the plurality of potential travel paths).

According to an exemplary embodiment of the invention, the presented method further comprises:
determining speed information for at least one vehicle at least partially based on one or more of the speed profiles determined for plurality of potential travel paths (e.g. the respective speed profiles for each potential travel path of the plurality of potential travel paths);
providing the speed information to the at least one vehicle.

For example, the at least one vehicle may request speed information for a travel route from an apparatus performing the presented method (e.g. a server, e.g. a server of the presented system). The request may specify the links (e.g. by link identifiers) and/or potential travel paths (e.g. by specifying the links at least partially defining the potential travel paths) included in the travel route.

The travel route may have been determined by the vehicle based on map data obtained or hold available by the at least one vehicle. Alternatively or additionally, the travel route may have been determined by a server (e.g. a server of the presented system) for the vehicle. Determining the travel route information may be at least partially based on a starting position and a destination position. For example, the starting position may represent the current position of the vehicle and the destination position may represent a position of a desired destination of a user of the vehicle. The starting position and the destination position may be obtained by the at least one vehicle, for example by capturing the current position of the vehicle by a GNSS sensor and/or by receiving a user input on a user interface of the vehicle.

The speed information for the at least one vehicle may be determined to represent the speed profiles for the potential travel paths that are included in the travel route. For example, the speed information may at least partially represent one speed profile determined for a potential travel path of the plurality of potential travel paths of the selected link.

Providing the speed information to the at least one vehicle may be understood to mean that the speed information are communicated or caused to be communicated to the at least one vehicle by an apparatus performing the presented method (e.g. by a server, e.g. a server of the presented system), for example by a communication interface of the apparatus. Alternatively or additionally, the speed information may be provided for use by the at least one vehicle, for example, for, at least in part, autonomously driving along the travel route. The speed information may cause the at least one vehicle to at least partially control and/or adapt its speed accordingly when driving along the route represented by the travel route information.

For example, the at least one vehicle may be, at least in part, an autonomous vehicle, a highly-assisted-driving vehicle, a vehicle with predictive cruise control, or a combination thereof. In certain embodiments of the invention, the vehicle may determine the speed information. Alternatively or additionally, the speed information may be determined by a server and communicated by the server to the vehicle.

According to an exemplary embodiment of the invention, the presented method is performed for a plurality of links of the travel network as selected link. This is understood to mean that the steps of the presented method may be performed (e.g. repeated) for further links of the plurality of links of the travel network as selected link.

It is to be understood that the presentation of the invention in this section is merely by way of examples and non-limiting.

Other features of the invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

Figure 1A:
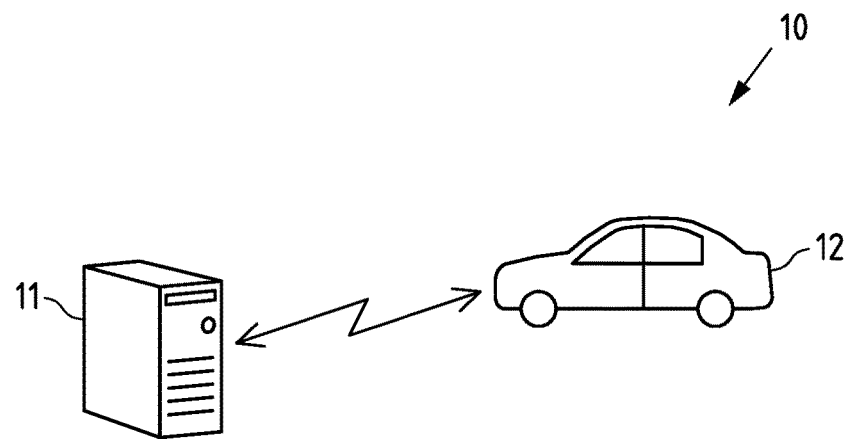
FIG. 1a is a block diagram of an exemplary embodiment of a system according to the invention.

The following description serves to deepen the understanding of the present invention and shall be understood to complement and be read together with the description of example embodiments of the invention as provided in the above SUMMARY section of this specification.

By way of example, considering an autonomous vehicle driving in free flow conditions, the autonomous vehicle equipped with high performance sensors and sufficient computing power continuously scans the environment and decides, in real time, the optimal driving speed, taking into consideration multiple road factors such as speed limit, slope, curvature, number of lanes or lane widths. As these factors change along the road, the vehicle has to continuously adapt the speed to a value which is optimal from the points of view of both safety and, if humans are transported by the vehicle, driver/passenger comfort. While the vehicle may be able to perform such computations in real time and to adopt the optimal speed based on sensor data only, such computations may be aided by "prior" knowledge for example provided by travel route information representing the current travel route of the vehicle and speed information representing speed profiles for the current travel route of the vehicle. For example, the vehicle could be configured to adapt the vehicle speed by default according to the speed information, while the final decision regarding the speed would be taken based on the information collected by the real time sensors. Since the vehicle may be already in the most probable state according to the historical experience of other drivers encoded in the speed profile, the real time changes dictated by the sensor observations would be minimal and only needed when deviations from the historical norm are observed. Such deviations may be expected in many cases which include recurring traffic congestion associated with the normal business hours and non-recurring congestion due to adverse weather conditions or incidents. The difference between an autonomous vehicle driving with and without this prior knowledge may be thought as analogous to the difference between a human driving in a familiar or un-familiar area. The same as the human driver is required to focus harder to understand the surroundings and navigate in an un-familiar area, the same way, an autonomous vehicle is expected to require more sensor information and computational power when driving without any prior knowledge.

Autonomous vehicles and vehicles equipped with predictive control can thus benefit from having available speed profiles or speed map data which provides typical driving speeds on every link with high spatial granularity. Such speed profiles can be used by predictive cruise control and autonomous vehicles to provide a human-like driving experience. However, a problem can appear on a link before a junction or a split in a travel route. The speed distribution on these links has a bi-modal or multi-modal structure and, therefore, a link-specific speed profile for such links would represent neither the high continuing speed nor the low turning or exiting speed of the one or more possible options. The standard deviation of the differences between such link-specific speed profiles and the ground truth speeds obtained by averaging multiple test drives collected by human drivers under free-flow conditions have been determined to span a range between 7 and 9 km/h.

FIG. 1a is a schematic high-level block diagram of a system 10 according to an exemplary aspect of the invention. System 10 comprises a server 11, which may alternatively be embodied as a server cloud (e.g. a plurality of servers connected e.g. via the internet and providing services at least partially jointly), and a vehicle 12.

According to exemplary embodiments of the present invention, server 11 may determine speed information for vehicle 12, for example server 11 may determine speed information for vehicle 12.

Vehicle 12 may be, at least in part, an autonomous vehicle, a highly-assisted-driving vehicle, a vehicle with predictive cruise control, or a combination thereof.

Communication between server 11 and vehicle 12 may for example take place at least partially in a wireless fashion, e.g. based on cellular radio communication or on Wireless Local Area Network (WLAN) based communication, to name but a few examples. In this way, mobility and connectivity of vehicle 12 is guaranteed.

Figure 1B:
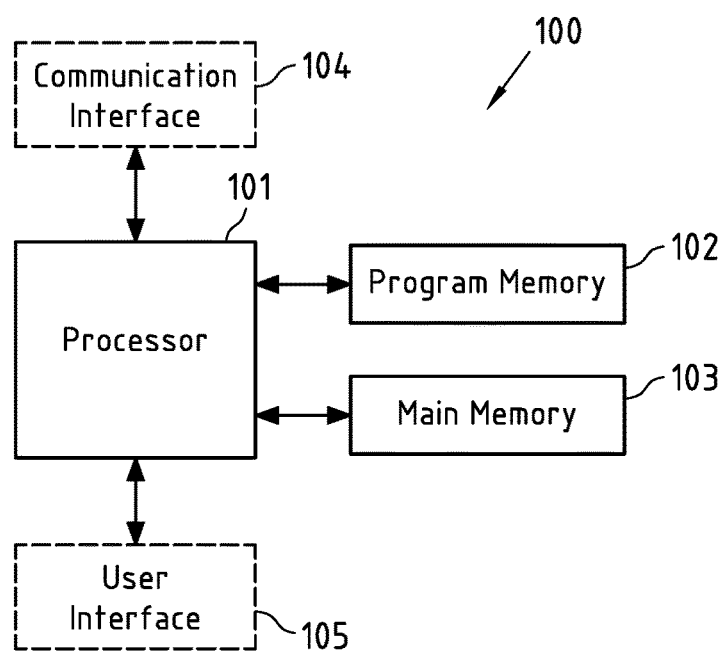
FIG. 1b is a block diagram of an exemplary embodiment of an apparatus according to the invention.

FIG. 1b is a block diagram of an apparatus 100 according to an exemplary aspect of the invention. Apparatus 100 may for example represent server 11 of system 10. Alternatively or additionally, apparatus 100 may for example represent an embedded navigational device of vehicle 12 of system 10.

Apparatus 100 comprises a processor 101. Processor 101 may represent a single processor or two or more processors, which are for instance at least partially coupled, for instance via a bus. Processor 101 executes a program code stored in program memory 102 (for instance program code causing apparatus 100 to perform one or more of the embodiments of a method (or parts thereof) according to the invention (as for instance further described below with reference to FIGS. 2a and 2b), when executed on processor 101), and interfaces with a main memory 103. Some or all of memories 102 and 103 may also be included into processor 101. One of or both of memories 102 and 103 may be fixedly connected to processor 101 or at least partially removable from processor 101, for instance in the form of a memory card or stick. Program memory 102 may for instance be a non-volatile memory. It may for instance be a FLASH memory (or a part thereof), any of a ROM, PROM, EPROM, MRAM or a FeRAM (or a part thereof) or a hard disc (or a part thereof), to name but a few examples. Program memory 102 may also comprise an operating system for processor 101. Program memory 102 may for instance comprise a first memory portion that is fixedly installed in apparatus 100, and a second memory portion that is removable from apparatus 100, for instance in the form of a removable SD memory card.

Main memory 103 may for instance be a volatile memory. It may for instance be a DRAM memory, to give non-limiting example. It may for instance be used as a working memory for processor 101 when executing an operating system and/or programs.

Processor 101 further controls an optional communication interface 104 configured to communicate with other devices (e.g. with server 11 or vehicle 12), for example by receiving and/or sending data and/or information. The communication may for example be based on a wireless communication connection. The communication interface 104 may thus comprise circuitry such as modulators, filters, mixers, switches and/or one or more antennas to allow wireless transmission and/or reception of signals. In embodiments of the invention, communication interface 104 is inter alia configured to allow communication based on a 2G/3G/4G/5G cellular radio communication and/or a non-cellular radio communication, such as for instance a WLAN communication. Alternatively or additionally, the communication may equally well be based on a wirebound communication connection or a combination of wireless and wirebound communication connections. Accordingly, the communication interface 104 may thus comprise circuitry such as modulators, filters, mixers, switches to allow a wirebound transmission and/or reception of signals. In embodiments of the invention, communication interface 104 is inter alia configured to allow communication based on an Ethernet communication such as a LAN (Local Area Network) communication.

Processor 101 further controls an optional user interface 105 configured to present information to a user of apparatus 100 and/or to receive information from such a user. User interface 105 may for instance be the standard user interface via which a user of apparatus 100 controls other functionality thereof. Examples of such a user interface are a touch-sensitive display, a keyboard, a touchpad, a display, etc.

The components 102-105 of apparatus 100 may for instance be connected with processor 101 by means of one or more serial and/or parallel busses.

It is to be understood that apparatus 100 may comprise various other components (e.g. a positioning sensor such as a Global Navigation Satellite System (GNSS) sensor).

Figure 2A:
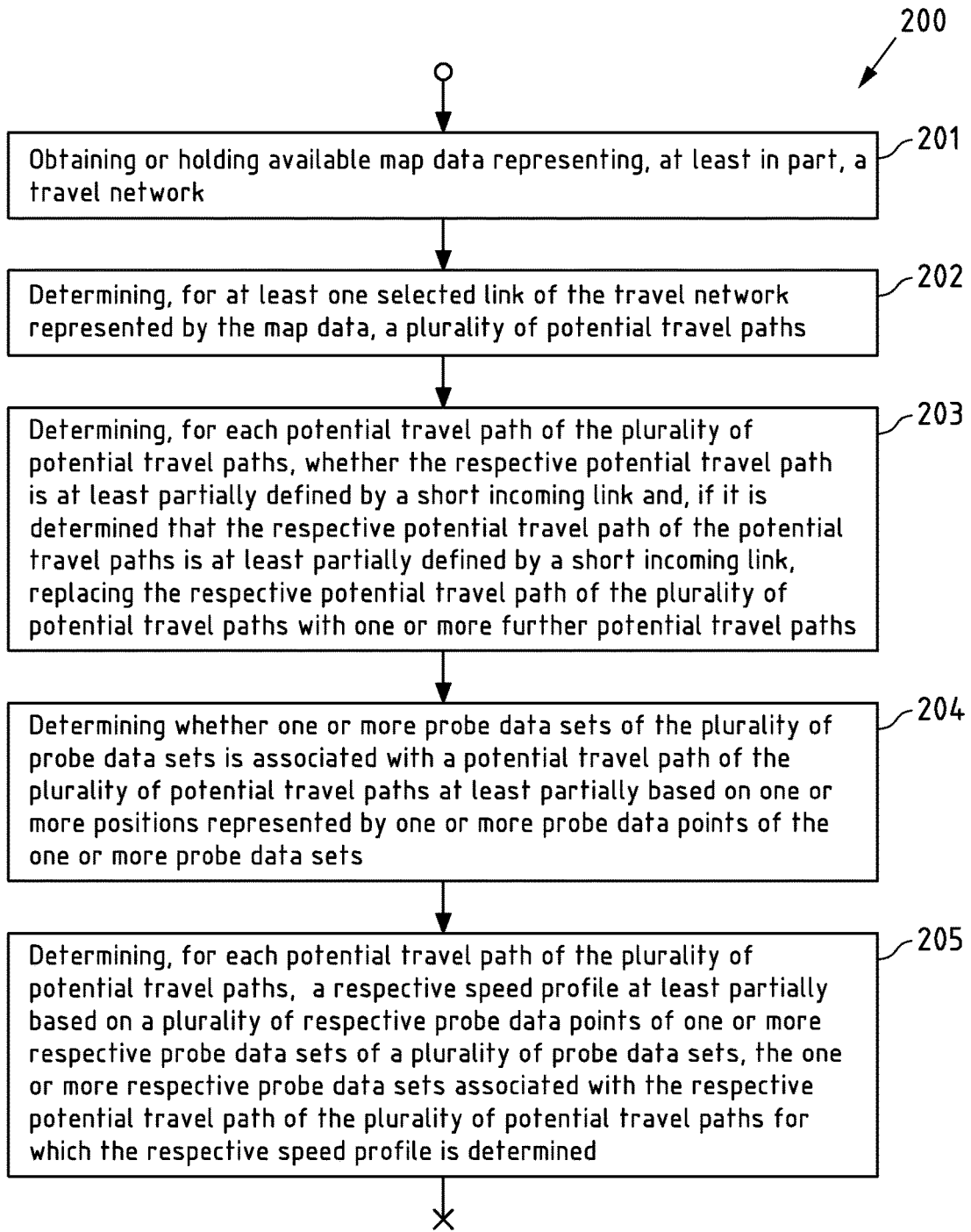
FIG. 2a-b are flowcharts of exemplary embodiments of a method according to the invention.

FIG. 2a is a flow chart 200 illustrating an exemplary embodiment of a method according to the invention. In the following, it is assumed that the steps of this flowchart 200 are performed by server 11 of system 10 of FIG. 1a.

In a step 201, server 11 obtains or holds available map data representing, at least in part, a travel network. The map data may for example be received by communication interface 104 of server 11 and, subsequently, be stored in memory 102 of server 11. For example, the map data may be part of a navigation database stored in memory 102 of server 11.

Figures 3A, 3B:
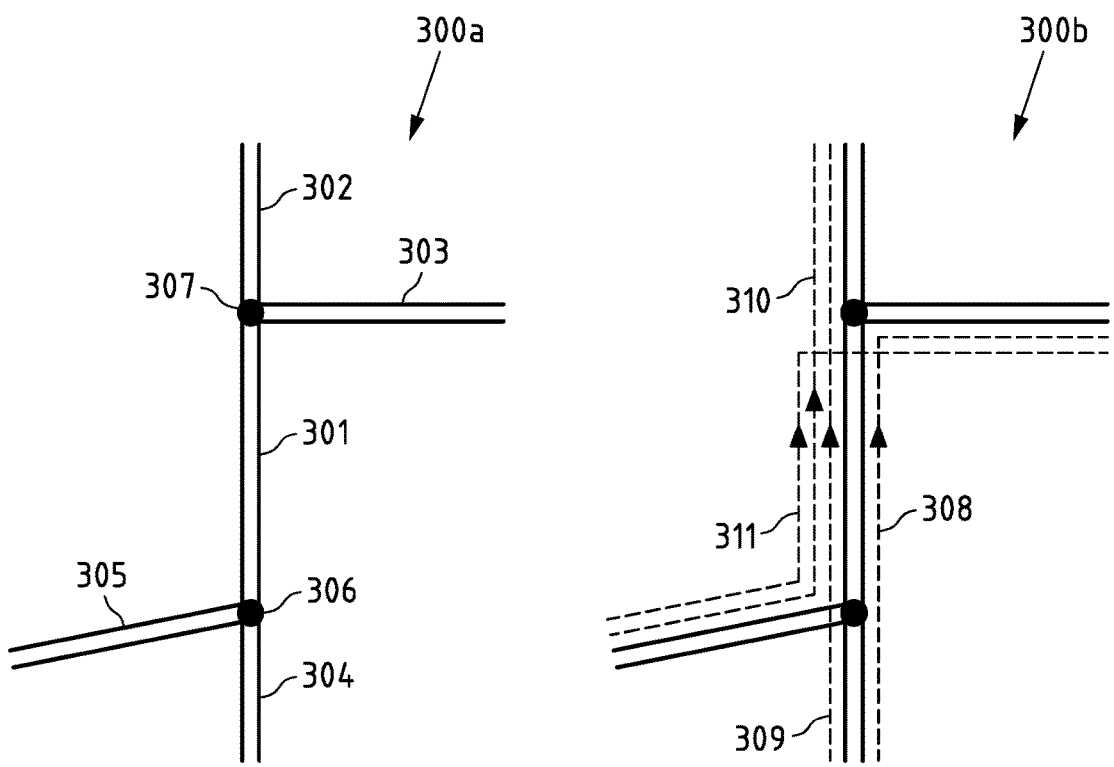
FIG. 3a-d are illustrations of at least parts of an exemplary travel network represented by map data and/or exemplary potential travel paths in this travel network.

FIG. 3a illustrates at least in pan an exemplary travel network 300a represented by such map data. It comprises links 301, 302, 303, 304 and 305 and junctions 306 and 307. A link of travel network 300a may for example be understood to represent a section of the travel network which is between two junctions like link 301 which is between junctions 306 and 307.

In the following, it is assumed that the reference signs of the links correspond to unique link identifiers associated with the links and a travel direction of the links may be indicated by the characters "T" or "F". Thus, link 301 may be identified by "301T" in one travel direction and by "301F" in the other travel direction.

In a step 202, server 11 determines a plurality of potential travel paths for at least one selected link of the travel network represented by the map data. Each potential travel path of the plurality of potential travel paths for the at least one selected link is at least partially defined by an incoming link of the travel network and an outgoing link of the travel network that are linked by the selected link and a direction of travel from the incoming link to the outgoing link on the selected link.

FIG. 3b illustrates a plurality of potential travel paths for link 301 of travel network 300a of FIG. 3a.

Accordingly, link 301 is the selected link for this plurality of potential travel paths which comprises potential travel paths 308-311. As indicated by the arrows on these potential travel paths, they only represent one travel direction of link 301 which is assumed to correspond to the "T" direction of link 301. Link 301 is identified by "301T" in this travel direction.

Only considering this travel direction of link 301, link 301 has two (direct) incoming links 304 and 305 and two outgoing links 302 and 303. Accordingly, for this travel direction only the four potential travel paths 308-311 exist.

For example, a potential travel path may only be determined for each allowed or possible option for entering or exiting the selected link in step 202. For example, if it is not allowed to turn from link 301 to 303 when travelling in the "T" direction on link 301, link 303 would not be considered as outgoing link in determining a plurality of potential travel paths for link 301 in "T" direction. In the following, it is however assumed that it is allowed to turn from link 301 to 303 when travelling in the "T" direction on link 301.

Each of the potential travel paths 308-311 may be defined by specifying one of the (direct) incoming links, one of the outgoing links and link 301 and, optionally, a direction of travel. Accordingly, the potential travel paths 308-311 may be specified by the following triplets:

301T-304T-303T (i.e. potential travel path 308);
301T-304T-302T (i.e. potential travel path 309);
301T-305T-302T (i.e. potential travel path 310);
301T-305T-303T (i.e. potential travel path 311).

As a result of the determining in step 202, a list defining the plurality of potential travel paths for the selected link may be obtained. In case of link 301 in "T" direction, the list may be as follows: {301T-304T-303T, 301T-304T-302T, 301T-305T-302T, 301T-305T-303T}.

In a step 203, server 11 determines, for each potential travel path of the plurality of potential travel paths determined in step 202, whether the respective potential travel path is at least partially defined by a short incoming link and, if it is determined that the respective potential travel path of the potential travel paths is at least partially defined by a short incoming link, server 11 replaces the respective potential travel path of the plurality of potential travel paths with one or more further potential travel paths. Accordingly step 203 is repeated for each potential travel path of the plurality of potential travel paths determined in step 202.

Each of the further potential travel paths is at least partially defined by a further (indirect) incoming link of the travel network linked by the short incoming link with the selected link and the outgoing link and a direction of travel from the further incoming link to the outgoing link on the selected link.

For example, an incoming link having a length below a predetermined length threshold may be determined to be a short incoming link. Examples of such a predetermined length threshold may be 200 m, 400 m or 600 m. For different link types (e.g. motorways, main roads and side roads) or in different areas different predetermined length thresholds may be used.

Alternatively or additionally, an incoming link may be determined to be a short incoming link if the length of the link is determined to be not sufficient for accelerating or decelerating to a speed limit on the incoming link or a mean speed for the incoming link or a median speed for the incoming link for a predetermined acceleration. An example of such a predetermined acceleration is 0.3 g and of such a predetermined deceleration is −0.3 g (with g describing the standard value of the gravitational acceleration, i.e. 9.80665 m/s2).

For example, in case of transitioning from a link with median speed $v_1$=30 km/h to an incoming link with median speed $v_2$=60 km/h, the acceleration distance would be $d_{12}$=$(v_2^2-v_1^2)/2a$=315 m with a=0.3 g. Furthermore, if the incoming link is to be exited with a median speed $v_3$=30 km/h, then the deceleration distance would be $d_{23}$=$(v_3^2-v^2)/2a$=315 m with a. In this case, the incoming link may be determined to be a short incoming link if its length is below $d_{12}+d_{23}$=630 m.

As described above, by replacing a respective potential travel path of the plurality of potential travel paths with the one or more further potential travel paths, if it is determined that the respective potential travel path of the potential travel paths is at least partially defined by a short incoming link, undesired effects associated with such short incoming links when determining a speed profile for a potential travel path may be compensated.

Figure 3C:
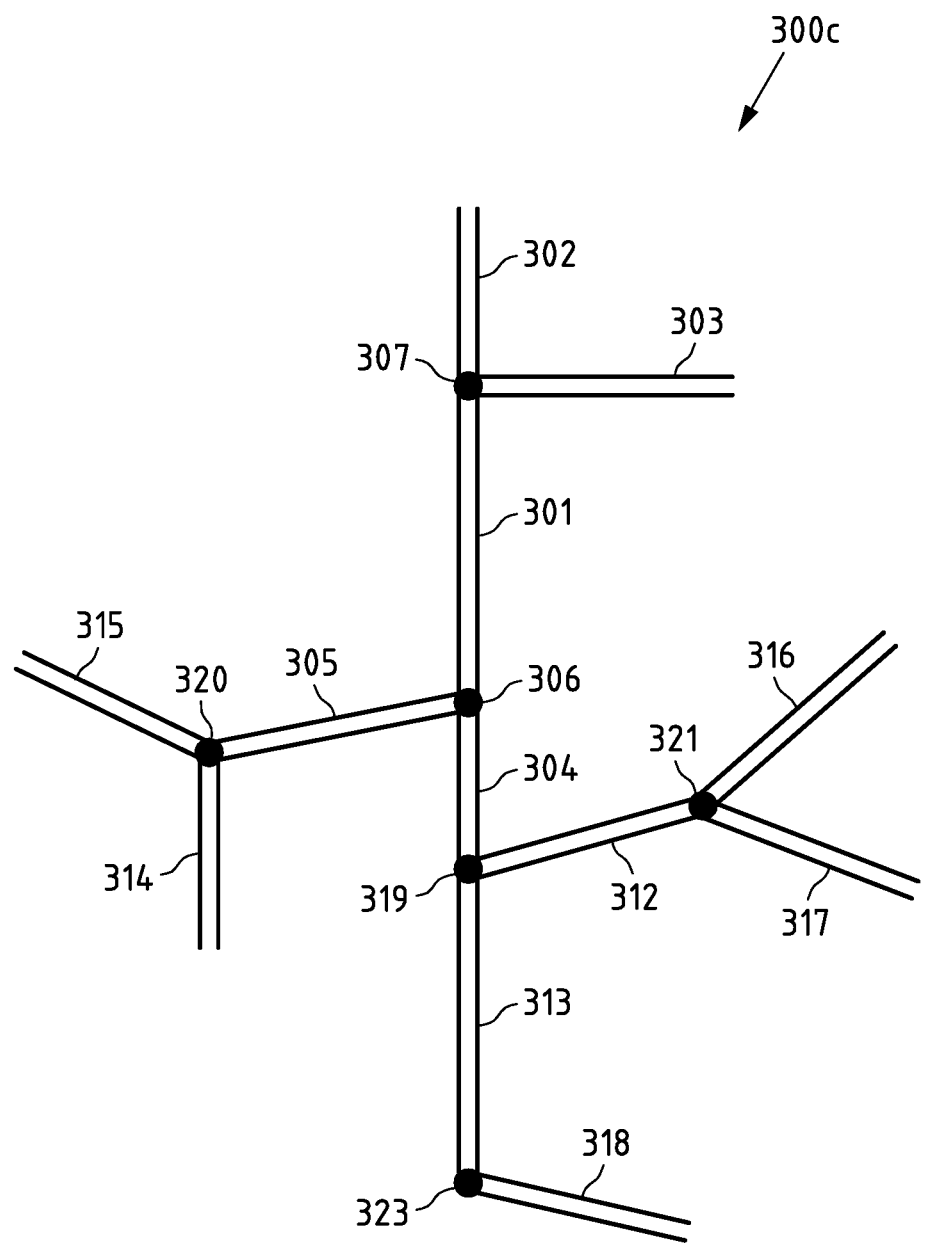

This is now explained with reference to FIG. 3c illustrating at least in part an exemplary travel network 300c. Travel network 300c at least partially corresponds to travel network 300a of FIGS. 3a and 3b and further comprises links 312-318 and junctions 319-323.

As described above, links 304 and 305 are incoming links at least partially defining potential travel paths 308-311 for link 301 as selected link. Links 312 and 313 are different from the selected link 301 and linked by incoming link 304 with selected link 301.

In the following it is assumed by way of example that incoming link 304 is a short incoming link. In the absence of stop signs or traffic lights, vehicles going from link 313, through incoming link 304 to selected link 301 travel at constant speed along these three links. Vehicles going from 312 slow down to enter incoming link 304, then accelerate on incoming link 304 and may enter selected link 301 still accelerating. Somewhere on selected link 301 vehicles coming from 312 will reach the same speed as vehicles coming from 313. In this situation, there may thus be a bimodal speed distribution of vehicles entering selected link 301 from incoming link 304 which may however not be properly reflected by potential travel paths 308 and 309 and by speed profiles determined for potential travel paths 308 and 309, because potential travel paths 308 and 309 do not differentiate between vehicles entering incoming link 304 from link 313 and vehicles entering incoming link 304 from link 312.

To compensate this effect, potential travel paths 308 and 309 may therefore be replaced by further potential travel paths taking the bimodal speed distribution of vehicles entering link 301 from link 304 into account.

Figure 3D:
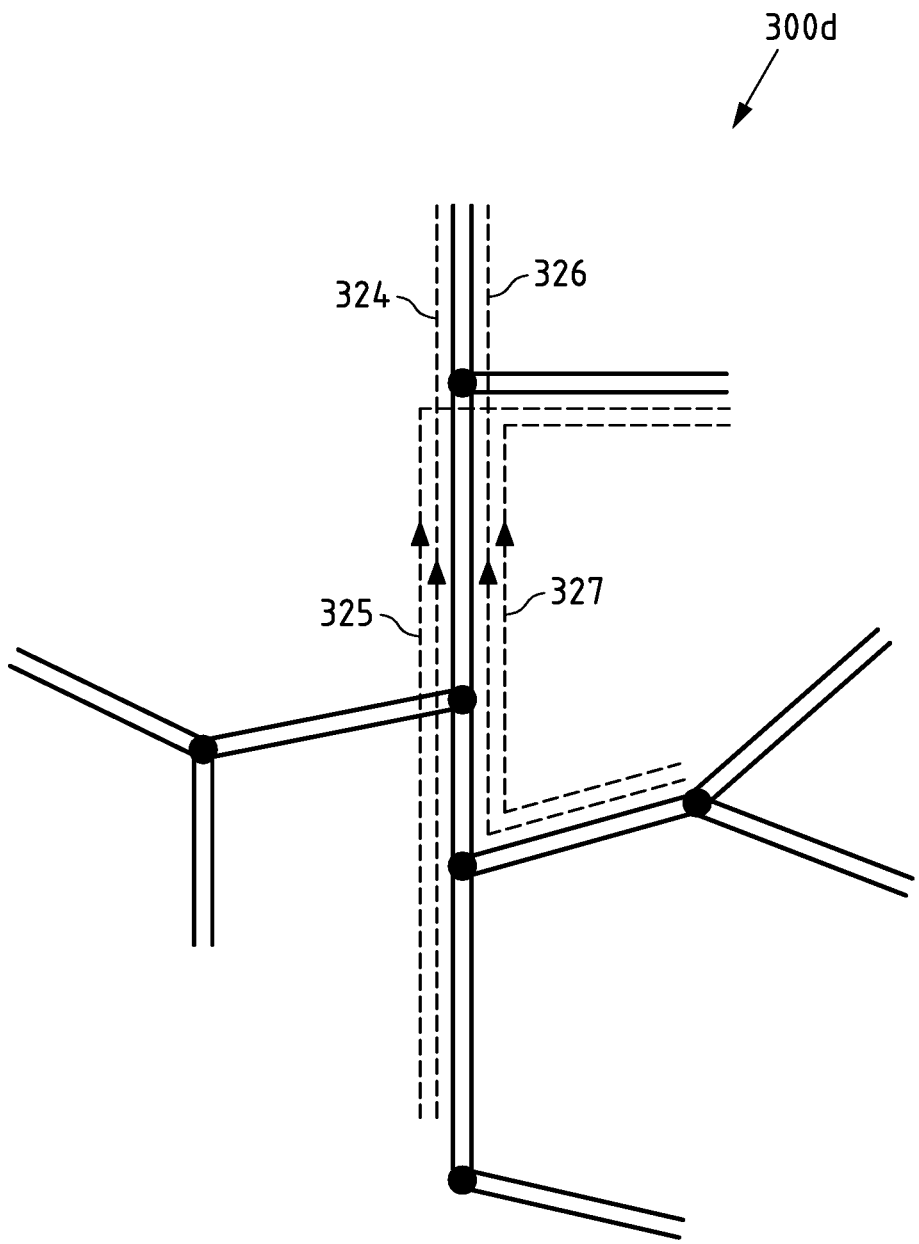

FIG. 3d illustrates such further potential travel paths 324-327 for replacing potential travel paths 308 and 309, if it is determined that incoming link 304 at least partially defining potential travel paths 308 and 309 is a short incoming link.

For example, the one or more further potential travel paths may only be determined for each allowed or possible option for entering the short incoming link or exiting the selected link in step 203.

Potential travel paths 324-327 are at least partially defined by links 312 and 313 as (indirect) incoming links through which selected link 301 may be (indirectly) entered. Links 312 and 313 are different from the selected link 301 and linked by (direct) incoming link 304 with selected link 301 so that selected link 301 can be indirectly entered through short incoming link 304 from (indirect incoming) links 312 and 313.

Each of the potential travel paths 324-327 may be defined by specifying one of the (indirect) incoming links, one of the outgoing links and link 301 and, optionally, a direction of travel. Furthermore, they may be labeled (e.g. by a "#") in order to be identified as replacements of a potential travel path determined to be at least partially defined by a short incoming link. Accordingly, the potential travel paths 324-327 may be specified as follows:

301T-313T-302T_# (i.e. potential travel path 324);
301T-313T-303T_# (i.e. potential travel path 325);
301T-312T-302T_# (i.e. potential travel path 326);
301T-312T-303T_# (i.e. potential travel path 327).

As a result of step 203, an adapted list defining the plurality of potential travel paths for the selected link may be obtained.

The potential travel paths (e.g. potential travel paths 308 and 309) determined to be at least partially defined by a short incoming link may be deleted from the list; and the one or more further potential travel paths (e.g. potential travel paths 324-327) that replaces the potential travel paths (e.g. potential travel paths 308 and 309) determined to be at least partially defined by a short incoming link may be added to the list.

In case of link 301 in "T" direction, the adapted list may be as follows: {301T-313T-302T_#, 301T-313T-303T_#, 301T-312T-302T_#, 301T-312T-303T_#, 301T-305T-302T, 301T-305T-303T}.

In a step 204, server 11 determines whether one or more probe data sets of the plurality of probe data sets is associated with a potential travel path of the plurality of potential travel paths (e.g. the potential travel paths defined in the list obtained in step 203) at least partially based on one or more positions represented by one or more probe data points of the one or more probe data sets.

Each probe data set of the plurality of probe data sets may comprise a sequence of probe data points representing a position and a speed of a mobile device. Each probe data point of a specific probe data set may comprise the identifier of the probe data set. The identifier may be indicative for a session of a service provider collecting probe data sets of a mobile device, a mobile device, or a combination thereof. Examples of such a mobile device may be a vehicle (e.g. vehicle 12), a navigation device and/or a smartphone.

The positions represented by the sequence of probe data points of a respective probe data set of the plurality of probe data sets may be a GNSS positions captured by a GNSS sensor of a specific mobile device when travelling along a travel route. Alternatively or additionally, the positions represented by the sequence of probe data points of a respective probe data set of the plurality of probe data sets may be map matched GNSS position representing a GNSS position captured by a GNSS sensor of the specific mobile device that has been matched to the travel network represented by the map data. A considerable amount of such probe data sets has been collected by service providers over time and this plurality of (historic) probe data sets can be used for determining travel path-specific speed profiles for the plurality of potential travel paths. To avoid a falsification of the potential travel path-specific speed profiles due to traffic congestions, only probe data sets collected during weekends and during night, from 8 pm to 7 am, during business days may be used for determining travel path-specific speed profiles for the plurality of potential travel paths.

A probe data set may be understood to be associated with a potential travel path of the plurality of potential travel path if the probe data set is associated with a travel route of a specific mobile device including the potential travel path. This may allow allocating the probe data points of the associated probe data sets for determining travel path-specific speed profiles for the plurality of potential travel path of the selected link. For example, a vehicle entering link 301 from link 305 and exiting on link 303 would travel on a travel route including potential travel path 311.

Ideally probe data points of a probe data set may only represent positions on one incoming link and one outgoing link. However, this may be not always the case in reality. For example, when a point based map matcher is used, positions close to junctions may be erroneously matched to the travel network represented by the map data. The impact of such erroneous positions may be minimized by a voting algorithm for identifying the most probable (indirect or direct) incoming link or outgoing link. The voting algorithm is at least partially based on the number of probe data points of the a probe data set that represent a position associated with an incoming link or an outgoing link at least partially defining one potential travel path of the plurality of potential travel path.

Multiple service providers anonymize the probe data points by changing the identifier every few seconds or minutes so that the positions represented by the probe data points having the same identifier cannot be tracked over three subsequent links. Furthermore, some links may be relatively short and, thus, no or only a few probe data point may represent a position on these short links. For example, probe data points of a probe data set may be only available on the selected link, but not on the (direct and/or indirect) incoming or outgoing links. Such cases may be due to low frequency GNSS capturing or to high speed mobile devices travelling on relatively short incoming/outgoing links. To minimize these effects, positions represented by probe data points may be traced not only to the (direct and/or indirect) incoming and outgoing links, but also on the links incoming into the (direct and/or indirect) incoming links and the links outgoing from the outgoing links.

The voting algorithm may therefore not only consider the (direct and/or indirect) incoming links and the outgoing links, but also links that are linked to the (direct and/or indirect) incoming links and the outgoing links. For example, a position represented by a probe data point of the one or more probe data sets of the plurality of probe data sets may be identified to be associated with an incoming link (e.g. a direct or indirect incoming link) or an outgoing link if one of the following conditions is met:
  the position is on the incoming link or outgoing link,
  the position is on a link different from the selected link and directly linked to the incoming link or the outgoing link.

This voting algorithm is now explained with reference to FIG. 3c.

As described above, link 305 is a (direct) incoming link at least partially defining potential travel paths 310-311 for link 301 as selected link, and links 312 and 313 are (indirect) incoming links at least partially defining potential travel paths 324-327 for link 301 as selected link. Links 314 and 315 are different from the selected link 301 and directly linked to incoming link 305. Links 316 and 317 are different from the selected link 301 and directly linked to incoming link 312. Link 318 is different from the selected link 301 and directly linked to incoming link 313.

For example, a probe data set of a high speed mobile device may comprise probe data points representing positions on selected link 301 but not on the relatively short incoming link 305. In order to avoid loss of a useful probe data set, it may be determined whether probe data points of this probe data set represent positions on link 314 or 315. The high speed mobile device travelling along link 314 or 315 must have also have traveled through link 305 to reach selected link 301 and therefore the corresponding probe data set may be recovered.

Accordingly, a position represented by a probe data point of a probe data set of the plurality of probe data sets may be considered to be associated with incoming link 305, if it is on one of links 305, 314 and 315, and to be associated with incoming link 312, if it is on one of links 312, 316 and 317, and to be associated with incoming link 313, if it is on one of links 313 and 318.

The numbers of probe data points of a specific probe data set associated with incoming links 305, 312 and 313 may be calculated as follows:

$$S_{305}^{ID1} = N_{305}^{ID1} + N_{314}^{ID1} + N_{315}^{ID1}$$

$$S_{312}^{ID1} = N_{312}^{ID1} + N_{316}^{ID1} + N_{317}^{ID1}$$

$$S_{313}^{ID1} = N_{313}^{ID1} + N_{318}^{ID1}$$

When the travel direction is also considered, the numbers of probe data points of a specific probe data set associated with incoming links 304 and 305 in direction "T" may be calculated as follows:

$$S_{305T}^{ID1} = N_{305T}^{ID1} + N_{314T}^{ID1} + N_{315T}^{ID1}$$

$$S_{312T}^{ID1} = N_{312T}^{ID1} + N_{316T}^{ID1} + N_{317T}^{ID1}$$

$$S_{313T}^{ID1} = N_{313T}^{ID1} + N_{318T}^{ID1}$$

Therein, "$N_Y^X$" is the number of probe data points of probe data set with identifier "X" representing a position on link "Y". These numbers may be determined, for each probe data set of the plurality of probe data sets, in advance and, for example, stored in program memory 102 of server 11.

The link with the largest number of probe data points of a probe data set of the plurality of probe data sets representing a position on this link is considered to be the link associated with this probe data set. Otherwise, the probe data set may be discarded (e.g. when there is no clear winner).

For example, if $S_{305T}^{ID1} > S_{312T}^{ID1} > S_{313T}^{ID1}$ then probe data set "ID1" is considered to be associated with incoming link 305T, and if $S_{305T}^{ID1} < S_{312T}^{ID1} < S_{313T}^{ID1}$ then probe data set "ID1" is considered to be associated with incoming link 313T, and if $S_{305T}^{ID1}=S_{312T}^{ID1}=S_{313T}^{ID1}$ then probe data set "ID1" is discarded as ambiguous.

This voting algorithm may be performed for each probe data set of the plurality of probe data sets and for each (direct and/or indirect) incoming link and outgoing link at least partially defining one or more potential travel paths of the plurality of potential travel paths.

A probe data set may then be determined to be associated with a potential travel path of the plurality of potential travel paths if it is at least partially defined by an incoming link considered to be associated with this probe data set and an outgoing link considered to be associated with this probe data set. Probe data sets which are only identified to be associated either with an incoming link or an outgoing link may be discarded. An exception may be, when one of the ends of the selected link is a dead end and has no outgoing links or incoming links.

For example, each probe data set of the plurality of probe data sets which is identified to be associated with links 305 and 303 in "T" direction may be determined to be associated with potential travel path 311.

As a result of the determining in step 204, for each potential travel paths of the plurality of potential, a list with identifiers of probe data sets that have been identified to be associated with the respective potential travel paths is obtained. The lists for potential travel paths 310, 311, 324-327 may be as follows:

potential travel path 310: {ID33, ID40, . . . };
potential travel path 311: {ID15, . . . }
potential travel path 324: {ID1, ID8, ID10, . . . };
potential travel path 325: {ID3, ID4, . . . };
potential travel path 326: {ID9, . . . };
potential travel path 327: {ID7, ID87, . . . }.

In a step 205, server 11 determines, for each potential travel path of the plurality of potential travel paths, a respective speed profile at least partially based on a plurality of respective probe data points of one or more respective probe data sets of a plurality of probe data sets which are associated with the respective potential travel path of the plurality of potential travel paths for which the respective speed profile is determined.

The plurality of respective probe data points may for example comprise the probe data points of the probe data sets that are determined to be associated with a respective potential travel path of the plurality of travel path in step 204.

In the following it is assumed that a speed profile for a potential travel path of the potential travel paths represents a plurality of speeds for a plurality of subsequent segments of the selected link. The selected link may be divided into the plurality of subsequent segments having the same length (e.g. 10 m).

A speed profile for a respective potential travel path of the plurality of potential travel paths may represent for each segment of this plurality of segments a speed percentile or a mean speed. For calculating the speed percentile or the mean speed for such a segment, only speeds represented by respective probe data points of the plurality of respective probe data points may be used that represent a position on the respective segment.

Examples of calculated speed percentiles are a 10% speed percentile, a 25% speed percentile, a 30% speed percentile, a 50% speed percentile (i.e. the median speed), a 70% speed percentile, a 75% speed percentile, a 90% speed percentile or combinations thereof.

For example, different speed profiles for a potential travel path could be determined for vehicles transporting human passengers (which have to account for the passenger comfort) and for vehicles transporting only goods or traveling empty to pick up passengers. For speed profiles for vehicles transporting human passengers for example the 50% speed percentile (i.e. the median speed) or the 70% speed percentile may be used, and for speed profiles for vehicles transporting only goods or traveling empty to pick up passengers for example the 75% speed percentile or the 90% speed percentile may be used.

As a result of the determining in step 205, a plurality of potential travel path-specific speed profiles for the selected link (e.g. link 301) may be obtained.

As described above, close to junctions, there are typically different populations of vehicles following different speed patterns. Junction 307 of travel network 300a of FIG. 3a shows such an example where link 301 forks into two links: forward link 302 continuing in the same direction and exit link 303 with traffic taking a 90-degree turn. The vehicles traveling forward will only slightly slow down, while the vehicles taking the right turn must slow down significantly to safely negotiate the sharp turn. A combined speed profile for vehicles following links 302 and 303 may thus display a significant speed drop close to junction 307. This speed drop is due to the exiting vehicles which have to slow down to negotiate the right turn. However, the speed drop does not represent the forward going vehicles for which the combined speed profile is inadequate. By determining a plurality of potential travel path-specific speed profiles for a selected link of the travel network (instead of a single link-specific speed profile for the selected link) this effect may be corrected. As described above, to account for all possible cases, for a selected link with N incoming links and M outgoing links, N×M speed profiles are determined.

The steps 201 to 205 may be repeated for each link of the travel network represented by the map data. Subsequently, a speed map data may be generated representing an association of the map data and a plurality of travel path-specific speed profiles for the links of the travel network.

Figure 2B:
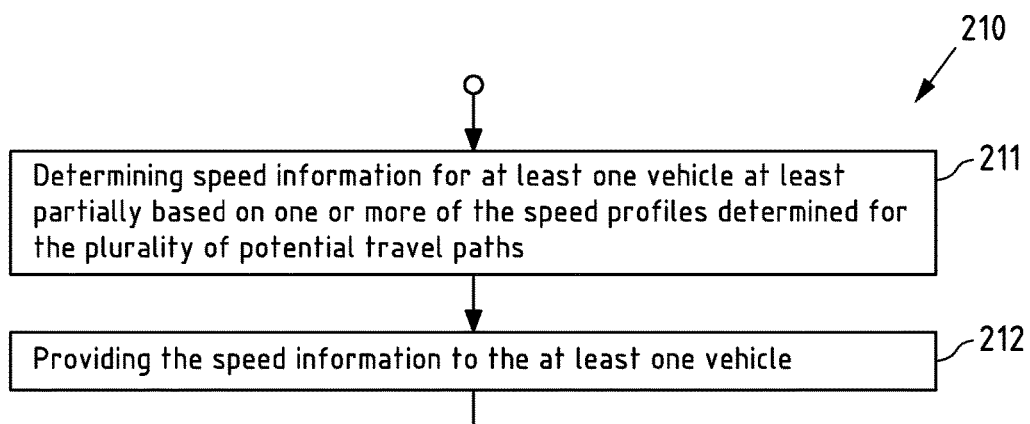

FIG. 2b is a flowchart 210 illustrating optional steps of the method according to the invention. The steps of flowchart 210 may for example be performed subsequent to the steps of flowchart 200 of FIG. 2a. In the following, it is assumed that the steps of this flowchart 210 are performed by server 11 of system 10 of FIG. 1a. Alternatively or additionally, the steps of this flowchart may be at least partially performed by vehicle 12 of system 10 of FIG. 1a.

In step 211, server 11 determines speed information for vehicle 12 at least partially based on one or more of the speed profiles determined in step 205 of flowchart 200 of FIG. 2a.

For example, server 11 may receive a request for determining speed information for a travel route from vehicle 12. The request may specify the links or potential travel paths included in the travel route.

The speed information for vehicle 12 may be determined to represent the potential travel path-specific speed profiles for the potential travel paths that are included in the travel route.

As described above, each of the plurality of speed profiles for a selected link may be specified by the identifier of the selected link, the identifier of the incoming link and the identifier of the outgoing link. With reference to FIGS. 3a and 3b described above, a travel route entering link 301 from link 305 and exiting on link 303 would include potential travel path 311 which may be defined by the following triplet: 301T-305T-303T. For example, the request for determining speed information for this travel route may specify potential travel path 311 by this triplet (301T-305T-303T). In this example, the speed information determined in step 211 may represent the speed profile for potential travel path 311 for link 301.

By way of example, the speed information may represent speed profiles at which despite the automotive capabilities of vehicle 12 in terms of speed, acceleration, braking, etc., a user may still feel comfortable and safe within the vehicle while traveling and/or the vehicle may interact safely with one or more other vehicles on the same route.

In step 212, server 11 may provide the speed information to vehicle 12. For example the speed information may be communicated from server 11 to vehicle 12.

Vehicle 12 may use the speed information for, at least in part, autonomously driving along the travel route. The speed information may cause vehicle 12 to at least partially control and/or adapt its speed accordingly when driving along the route represented by the travel route information.

Figure 4:
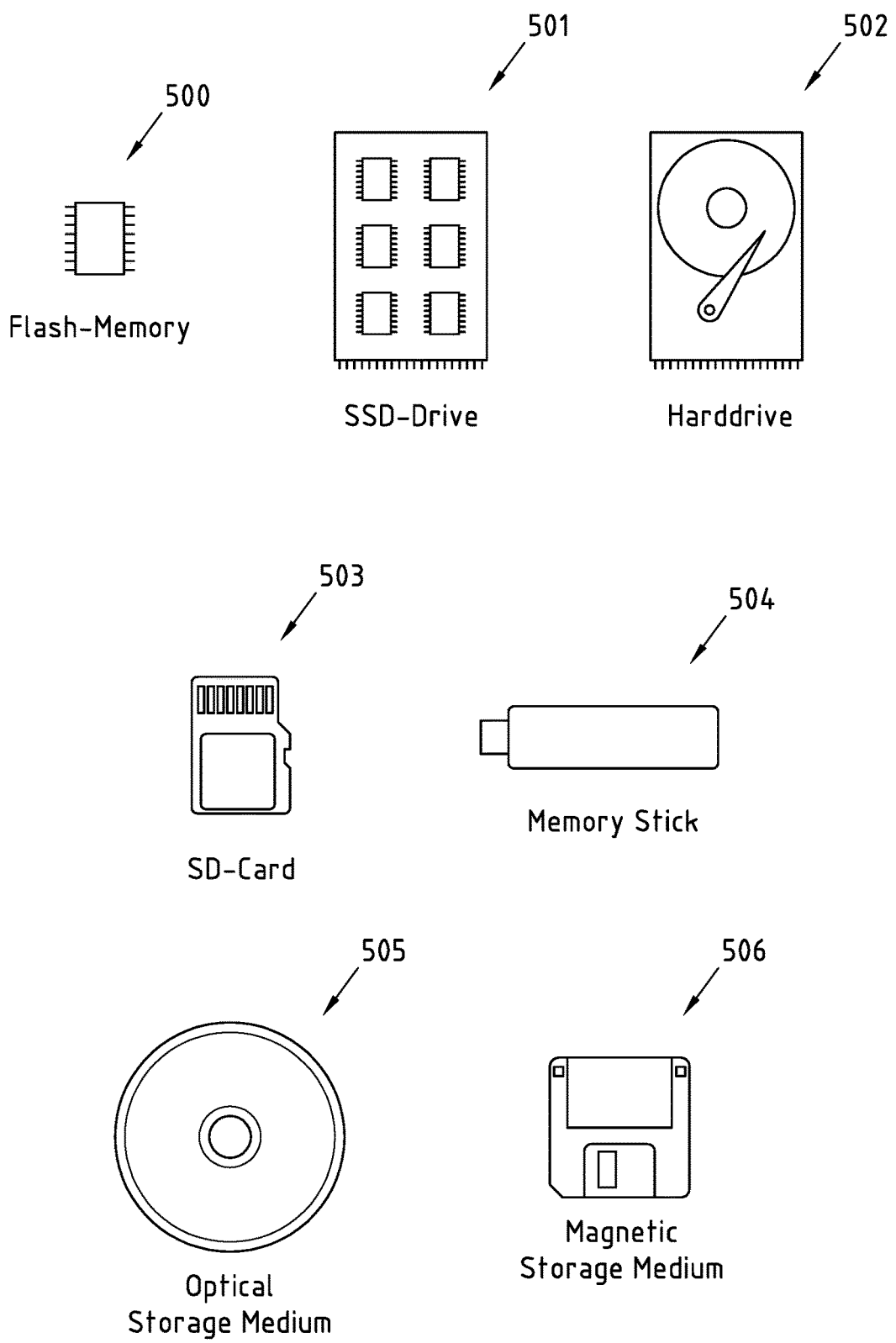
FIG. 4 is a schematic illustration of examples of tangible and non-transitory storage media according to the present invention.

FIG. 4 is a schematic illustration of examples of tangible and non-transitory computer-readable storage media according to the present invention that may for instance be used to implement program memory 102 of FIG. 1. To this end, FIG. 4 displays a flash memory 500, which may for instance be soldered or bonded to a printed circuit board, a solid-state drive 501 comprising a plurality of memory chips (e.g. Flash memory chips), a magnetic hard drive 502, a Secure Digital (SD) card 503, a Universal Serial Bus (USB) memory stick 504, an optical storage medium 505 (such as for instance a CD-ROM or DVD) and a magnetic storage medium 506.

In the present specification, any presented connection in the described embodiments is to be understood in a way that the involved components are operationally coupled. Thus, the connections can be direct or indirect with any number or combination of intervening elements, and there may be merely a functional relationship between the components.

Moreover, any of the methods, processes, steps and actions described or illustrated herein may be implemented using executable instructions in a general-purpose or special-purpose processor and stored on a computer-readable storage medium (e.g., disk, memory, or the like) to be executed by such a processor. References to a 'computer-readable storage medium' should be understood to encompass specialized circuits such as FPGAs, ASICs, signal processing devices, and other devices.

The expression "A and/or B" is considered to comprise any one of the following three scenarios: (i) A, (ii) B, (iii) A and B. Furthermore, the article "a" is not to be understood as "one", i.e. use of the expression "an element" does not preclude that also further elements are present. The term "comprising" is to be understood in an open sense, i.e. in a way that an object that "comprises an element A" may also comprise further elements in addition to element A.

It will be understood that all presented embodiments are only exemplary, and that any feature presented for a particular example embodiment may be used with any aspect of the invention on its own or in combination with any feature presented for the same or another particular example embodiment and/or in combination with any other feature not mentioned. In particular, the example embodiments presented in this specification shall also be understood to be disclosed in all possible combinations with each other, as far as it is technically reasonable and the example embodiments are not alternatives with respect to each other. It will further be understood that any feature presented for an example embodiment in a particular category (method/apparatus/computer program) may also be used in a corresponding manner in an example embodiment of any other category. It should also be understood that presence of a feature in the presented example embodiments shall not necessarily mean that this feature forms an essential feature of the invention and cannot be omitted or substituted.

The sequence of all method steps presented above is not mandatory, also alternative sequences may be possible. Nevertheless, the specific sequence of method steps exemplarily shown in the figures shall be considered as one possible sequence of method steps for the respective embodiment described by the respective figure.

The invention has been described above by means of example embodiments. It should be noted that there are alternative ways and variations which are obvious to a skilled person in the art and can be implemented without deviating from the scope of the appended claims.

The invention claimed is:

1. A method, said method comprising:

obtaining or holding available map data representing, at least in part, a travel network, determining, for at least one first link of said travel network represented by said map data, a plurality of potential travel paths, wherein each potential travel path of said plurality of potential travel paths for said at least one first link is at least partially defined by an incoming link of said travel network and an outgoing link of said travel network that are linked by said first link and a direction of travel from said incoming link to said outgoing link on said first link, for each potential travel path of said plurality of potential travel paths, determining whether a potential travel path is at least partially defined by a short incoming link and, if it is determined that a potential travel path is at least partially defined by a short incoming link, replacing said potential travel path with one or more further potential travel paths, wherein each of said further potential travel paths is at least partially defined by a further incoming link of said travel network linked by said short incoming link with said first link and said outgoing link and a direction of travel from said further incoming link to said outgoing link on said first link, wherein said short incoming link is an incoming link extending a length between a predetermined starting location and a predetermined ending location such that at least one of (a) the length of the incoming link is shorter than a predetermined length threshold or (b) a the length of the incoming link is not sufficient for accelerating to a speed corresponding to the incoming link using a predetermined acceleration, for each potential travel path of said plurality of potential travel paths, determining a respective speed profile at least partially based on a plurality of respective probe data points of one or more respective probe data sets of a plurality of probe data sets, said one or more respective probe data sets associated with said respective potential travel path for which said respective speed profile is determined, determining speed information for at least one autonomous vehicle at least partially based on one or more of said speed profiles determined for said plurality of potential travel paths, and providing said speed information to said at least one autonomous vehicle, wherein an onboard processor of the at least one autonomous vehicle is configured to use said provided speed information when controlling the at least one autonomous vehicle.

2. The method according to claim 1, wherein the speed corresponding to the incoming link is at least one of:

a length of said incoming link,
a speed limit on said incoming link,
a mean speed for said incoming link,
a median speed for said incoming link.

3. The method according to claim 1, wherein said plurality of potential travel paths comprises a potential travel path for each allowed combination of an incoming link and an outgoing link represented by the map data and linked by said first link or, in case of a short incoming link, linked by said first link and a short incoming link.

4. The method according to claim 1, said method further comprising:
obtaining or holding available said plurality of probe data sets.

5. The method according to claim 1, wherein said respective speed profile represents one speed for said first link or a plurality of speeds for a plurality of subsequent segments of said first link.

6. The method according to claim 1, wherein each probe data point represents a position and a speed.

7. The method according to claim 6, wherein said respective speed profile is at least partially determined by calculating one or more mean speeds, one or more speed percentiles or one or more combinations thereof for said first link or for one or more subsequent segments of said first link.

8. The method according to claim 7, wherein said calculating is at least partially based on one or more speeds represented by one or more probe data points of said plurality of respective probe data points of said one or more respective probe data sets associated with a potential travel path of said plurality of potential travel paths.

9. The method according to claim 6, said method further comprising:
determining whether one or more probe data sets of said plurality of probe data sets is associated with a potential travel path of said plurality of potential travel paths at least partially based on one or more positions represented by one or more probe data points of said one or more probe data sets.

10. The method according to claim 9, wherein each probe data set of said plurality of probe data sets is determined to be associated with only one potential travel path of said plurality of potential travel paths.

11. The method according to claim 9, wherein said one or more probe data sets of said plurality of probe data sets are determined to be associated with a potential travel path of said plurality of potential travel paths at least partially based on the number of probe data points of said one or more probe data sets that represent a position associated with an incoming link or an outgoing link at least partially defining said potential travel path.

12. The method according to claim 11, wherein a condition for identifying a position represented by a probe data point of said one or more probe data sets of said plurality of probe data sets to be associated with an incoming link is at least one of the following:
said position is on said incoming link,
said position is on a link different from said first link and directly linked to said incoming link.

13. The method according to claim 11, wherein a condition for identifying a position represented by a probe data point of said one or more probe data sets of said plurality of probe data sets to be associated with an outgoing link is at least one of the following:
said position is on said outgoing link,
said position is on a link different from said first link and directly linked to said outgoing link.

14. The method according to claim 1, said method further comprising:
providing or generating speed map data representing an association of said map data and a plurality of speed profiles for links of said travel network, said plurality of speed profiles comprising said speed profiles determined for said plurality of potential travel paths.

15. The method according to claim 1, wherein said at least one autonomous vehicle is, at least in part, a self-driving vehicle, a highly assisted-driving vehicle, or a combination thereof.

16. The method according to claim 1, wherein said method is performed for a plurality of links of said travel network as first link.

17. An apparatus comprising at least one processor and at least one memory including computer program code for one or more programs, the at least one memory and the computer program code configured to, with the at least one processor, cause the apparatus to at least:
obtain or hold available map data representing, at least in part, a travel network,
determine, for at least one first link of said travel network represented by said map data, a plurality of potential travel paths, wherein each potential travel path of said plurality of potential travel paths for said at least one first link is at least partially defined by an incoming link of said travel network and an outgoing link of said travel network that are linked by said first link and a direction of travel from said incoming link to said outgoing link on said first link,
for each potential travel path of said plurality of potential travel paths, determine whether a potential travel path is at least partially defined by a short incoming link and, if it is determined that a potential travel path is at least partially defined by a short incoming link, replacing said potential travel path with one or more further potential travel paths, wherein each of said further potential travel paths is at least partially defined by a further incoming link of said travel network linked by said short incoming link with said first link and said outgoing link and a direction of travel from said further incoming link to said outgoing link on said first link, wherein said short incoming link is an incoming link extending a length between a predetermined starting location and a predetermined ending location such that at least one of (a) the length of the incoming link is shorter than a predetermined length threshold or (b) the length of the incoming link is not sufficient for accelerating to a speed corresponding to the incoming link using a predetermined acceleration,
for each potential travel path of said plurality of potential travel paths, determine a respective speed profile at least partially based on a plurality of respective probe data points of one or more respective probe data sets of a plurality of probe data sets, said one or more respective probe data sets associated with said respective potential travel path for which said respective speed profile is determined,
determine speed information for at least one autonomous vehicle at least partially based on one or more of said speed profiles determined for said plurality of potential travel paths, and
provide said speed information to said at least one autonomous vehicle, wherein an onboard processor of the at least one autonomous vehicle is configured to use said provided speed information when controlling the at least one autonomous vehicle.

18. The apparatus according to claim 17, wherein the speed corresponding to the incoming link is at least one of:
  a length of said incoming link,
  a speed limit on said incoming link,
  a mean speed for said incoming link,
  a median speed for said incoming link.

19. The apparatus according to claim 17, wherein said plurality of potential travel paths comprises a potential travel path for each allowed combination of an incoming link and an outgoing link represented by the map data and linked by said first link or, in case of a short incoming link, linked by said first link and a short incoming link.

20. The apparatus according to claim 17, said apparatus further caused to:
  obtain or hold available said plurality of probe data sets.

21. The apparatus according to claim 17, wherein said respective speed profile represents one speed for said first link or a plurality of speeds for a plurality of subsequent segments of said first link.

22. The apparatus according to claim 17, wherein each probe data point represents a position and a speed.

23. The apparatus according to claim 22, wherein said respective speed profile is at least partially determined by calculating one or more mean speeds, one or more speed percentiles or one or more combinations thereof for said first link or for one or more subsequent segments of said first link.

24. The apparatus according to claim 23, wherein said calculating is at least partially based on one or more speeds represented by one or more probe data points of said plurality of respective probe data points of said one or more respective probe data sets associated with a potential travel path of said plurality of potential travel paths.

25. The apparatus according to claim 22, said apparatus further caused to:
  determine whether one or more probe data sets of said plurality of probe data sets is associated with a potential travel path of said plurality of potential travel paths at least partially based on one or more positions represented by one or more probe data points of said one or more probe data sets.

26. The apparatus according to claim 25, wherein each probe data set of said plurality of probe data sets is determined to be associated with only one potential travel path of said plurality of potential travel paths.

27. The apparatus according to claim 25, wherein said one or more probe data sets of said plurality of probe data sets are determined to be associated with a potential travel path of said plurality of potential travel paths at least partially based on the number of probe data points of said one or more probe data sets that represent a position associated with an incoming link or an outgoing link at least partially defining said potential travel path.

28. The apparatus according to claim 27, wherein a condition for identifying a position represented by a probe data point of said one or more probe data sets of said plurality of probe data sets to be associated with an incoming link is at least one of the following:
  said position is on said incoming link,
  said position is on a link different from said first link and directly linked to said incoming link.

29. The apparatus according to claim 27, wherein a condition for identifying a position represented by a probe data point of said one or more probe data sets of said plurality of probe data sets to be associated with an outgoing link is at least one of the following:
  said position is on said outgoing link,
  said position is on a link different from said first link and directly linked to said outgoing link.

30. The apparatus according to claim 17, said apparatus further caused to:
  provide or generate speed map data representing an association of said map data and a plurality of speed profiles for links of said travel network, said plurality of speed profiles comprising said speed profiles determined for said plurality of potential travel paths.

31. The apparatus according to claim 17, wherein said at least one autonomous vehicle is, at least in part, an autonomous a self-driving vehicle, a highly-assisted-driving vehicle, or a combination thereof.

32. The apparatus according to claim 17, wherein said apparatus is or is part of one of:
  a server;
  a stationary device;
  a module for a device;
  an autonomous vehicle;
  an embedded navigation device of an autonomous vehicle.

33. A non-transitory computer readable storage medium including one or more sequences of one or more instructions which, when executed by one or more processors, cause an apparatus to at least perform:
  obtaining or holding available map data representing, at least in part, a travel network,
  determining, for at least one first link of said travel network represented by said map data, a plurality of potential travel paths, wherein each potential travel path of said plurality of potential travel paths for said at least one first link is at least partially defined by an incoming link of said travel network and an outgoing link of said travel network that are linked by said first link and a direction of travel from said incoming link to said outgoing link on said first link,
  for each potential travel path of said plurality of potential travel paths, determining whether a potential travel path is at least partially defined by a short incoming link and, if it is determined that a potential travel path is at least partially defined by a short incoming link, replacing said potential travel path with one or more further potential travel paths, wherein each of said further potential travel paths is at least partially defined by a further incoming link of said travel network linked by said short incoming link with said first link and said outgoing link and a direction of travel from said further incoming link to said outgoing link on said first link, wherein said short incoming link is an incoming link extending a length between a predetermined starting location and a predetermined ending location such that at least one of (a) the length of the incoming link is shorter than a predetermined length threshold or (b) a the length of the incoming link is not sufficient for accelerating to a speed corresponding to the incoming link using a predetermined acceleration,
  for each potential travel path of said plurality of potential travel paths, determining a respective speed profile at least partially based on a plurality of respective probe data points of one or more respective probe data sets of a plurality of probe data sets, said one or more respective probe data sets associated with said respective potential travel path for which said respective speed profile is determined, determine speed information for at least one autonomous vehicle at least partially based on one or more of said speed profiles determined for said plurality of potential travel paths, and provide said speed information to said at least one autonomous vehicle, wherein an onboard processor of the at least one autonomous vehicle is configured to use said provided speed information when controlling the at least one autonomous vehicle.

\* \* \* \* \*